United States Patent

Swanson et al.

[15] 3,703,957
[45] Nov. 28, 1972

[54] PNEUMATIC SEPARATOR, FILTER AND PARTICLE CONVEYING SYSTEM

[72] Inventors: Kenneth W. Swanson, Route 2 Box 300, Excelsior, Minn. 55331; William C. Rolland, 1618 Eustis Street, St. Paul, Minn. 55104; Michael J. Kraft, 3809 E. Sibley, Savage, Minn. 55378

[22] Filed: March 6, 1968

[21] Appl. No.: 711,114

[52] U.S. Cl. .......................209/144, 55/348, 55/465
[51] Int. Cl. ..................................................B04c 9/00
[58] Field of Search ......118/312, 603; 209/144, 132, 209/133, 134; 55/315, 385, 434, 439, 465, 462; 302/59, 22

[56] References Cited

UNITED STATES PATENTS

| 2,939,579 | 6/1960 | Hardinge | 209/144 |
| 3,235,090 | 2/1966 | Bose et al. | 209/144 X |
| 3,316,836 | 5/1967 | Epstein | 209/144 UX |
| 3,439,650 | 4/1969 | Stowell | 209/144 X |

FOREIGN PATENTS OR APPLICATIONS

| 86,851 | 6/1957 | Netherlands | 209/144 |

OTHER PUBLICATIONS

Perry, Chemical Engineer's Handbook, 4th Ed., McGraw-Hill N.Y., 1963, p. 8-28.

Primary Examiner—Frank W. Lutter
Assistant Examiner—Ralph J. Hill
Attorney—Merchant & Gould

[57] ABSTRACT

In dry copying machines utilizing particulate toner a particle conveying system including a plurality of pneumatic ducts and a blower with a vacuum-type pickup device attached to an inlet of the blower and positioned to remove loose particles from the copies as they egress from the copying machine, a centrifugal separator positioned in the pneumatic system to receive the air and particles from the vacuum pickup device and separate the particles from the bulk of the air, a particle settling chamber having baffles therein attached to the copying machine and receiving separated particles from the separator so as to return them to active use in the copying machine and further having an outlet duct attached to the blower to reduce the pressure therein slightly below atmospheric, and a filter assembly attached to the air outlet of the separator so that air leaving the separator is filtered prior to being returned to the atmosphere. The filter assembly is constructed from an extruded plastic housing having two sidewalls and a joining wall connected to provide a U-shaped cross section and a pleated filter element connected to the sidewalls opposite the joining wall and end walls formed of plastic while in its formable state and subsequently hardened to provide sealing engagement with the ends of said housing and pleated filter.

3 Claims, 6 Drawing Figures

PATENTED NOV 28 1972 3,703,957

INVENTORS.
KENNETH W. SWANSON
WILLIAM C. ROLLAND
MICHAEL J. KRAFT
BY
Merchant & Gould
ATTORNEYS

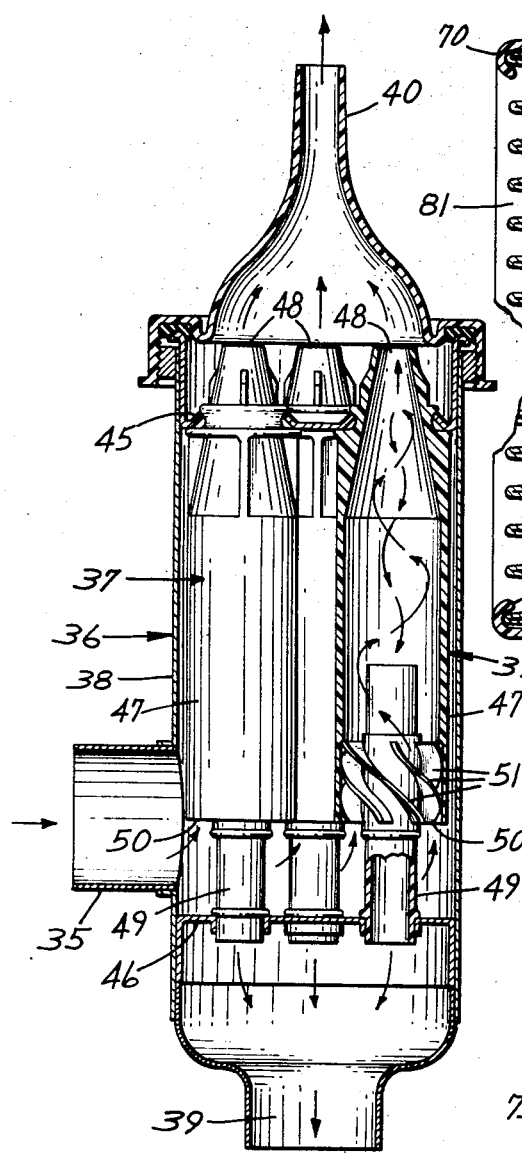
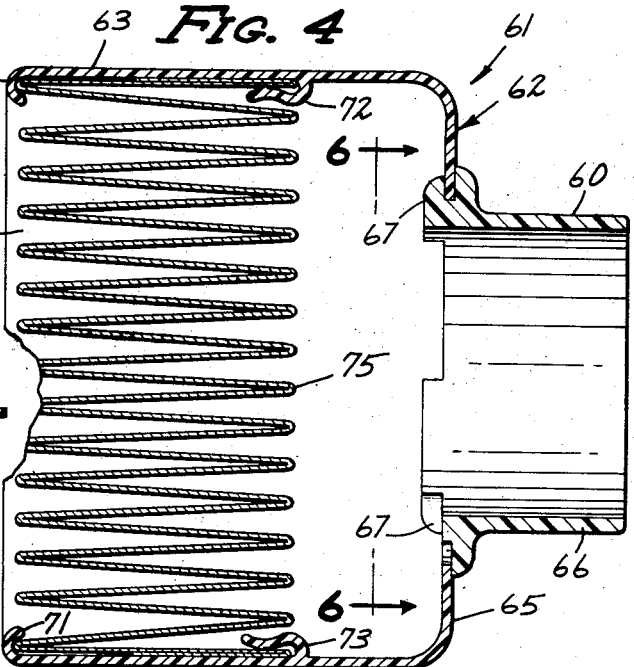
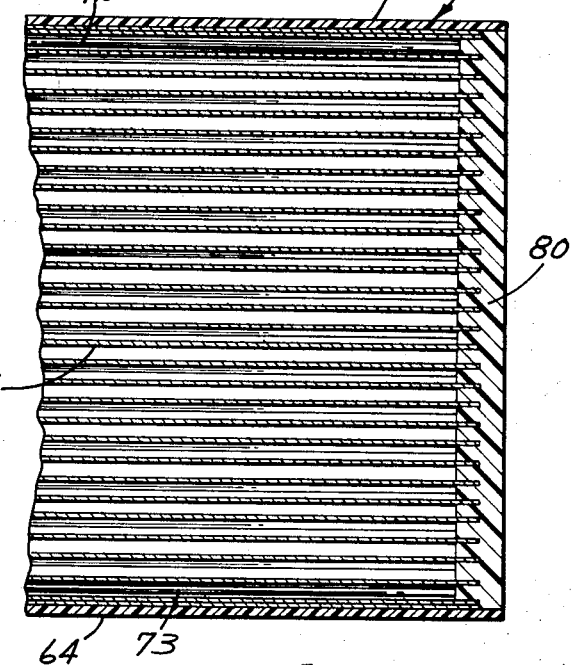
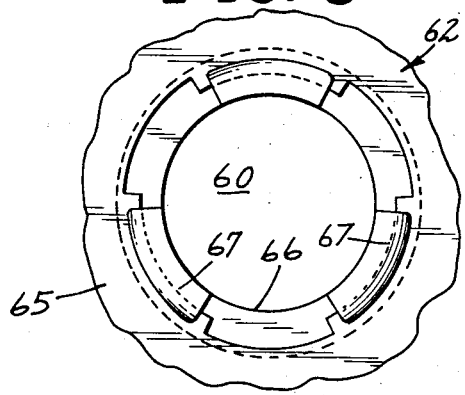

PNEUMATIC SEPARATOR, FILTER AND PARTICLE CONVEYING SYSTEM

BACKGROUND OF THE INVENTION

1. Field of the Invention

In dry copying machines utilizing particulate toner, loose toner particles must be removed from the surface of the copies prior to permanently fixing the particles thereto. Also, much of the toner adheres to the copies without being permanently affixed thereto. These loose toner particles must be removed from the copies prior to the egress of the copies from the copying machine or they will contaminate the surrounding atmosphere, as well as the machine and the operator. These particles, if collected, are reusage. It should be understood that the present invention can be utilized on many machines utilizing particulate matter therein and copying machines are only utilized in the description for exemplary purposes.

2. Description of the Prior Art

In the prior art toner particles are collected from the copies by means of a pneumatic stream and they are subsequently removed from the pneumatic stream and stored in a receptacle. This system is undesirable because the receptacle requires periodic emptying and handling of the toner particles by an operator. In some instances the toner particles are simply passed into the atmosphere. This system is undesirable because of the contamination of the surrounding atmosphere and the loss of the toner particles.

SUMMARY OF THE INVENTION

The present invention pertains to an improvement in copying machines utilizing particulate toner including a pneumatic conveyance system having a plurality of conduits operatively attached to propelling means for providing pneumatic flow therein with toner particle pickup means attached to an inlet thereof and positioned adjacent the copy outlet, separating means receiving the toner particles from the pickup means and separating them from the main pneumatic flow, a particle settling chamber receiving the toner particles from the separating means and attached to the copying machine so as to return the particles to reuse, said settling chamber having a pneumatic outlet conduit attached to an inlet of the pneumatic conveyance system for reducing the pressure therein slightly below atmospheric, and an optional filter assembly attached to receive the pneumatic flow from the separating means and return it to the atmosphere after removing any remaining toner particles therein.

It is an object of the present invention to provide an improvement in copying machines utilizing particulate toner.

It is a further object of the present invention to provide apparatus for removing loose toner particles from copies produced by a copying machine and returning said loose particles to the copying machine for reuse.

It is a further object of the present invention to provide apparatus for returning loose toner particles to a copying machine for reuse without the necessity of a human operator.

It is a further object of the present invention to provide a new and novel filter assembly for use with the toner particle conveying system.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 2 is an enlarged sectional view as seen from the line 2—2 in FIG. 1;

FIG. 4 is an enlarged sectional view as seen from the line 4—4 in FIG. 1;

FIG. 5 is an enlarged sectional view as seen from the line 5—5 in FIG. 1;

FIG. 6 is a view of the inlet of the filter assembly as seen from the line 6—6 in FIG. 4.

DESCRIPTION OF THE PREFERRED EMBODIMENT

Figure 1:
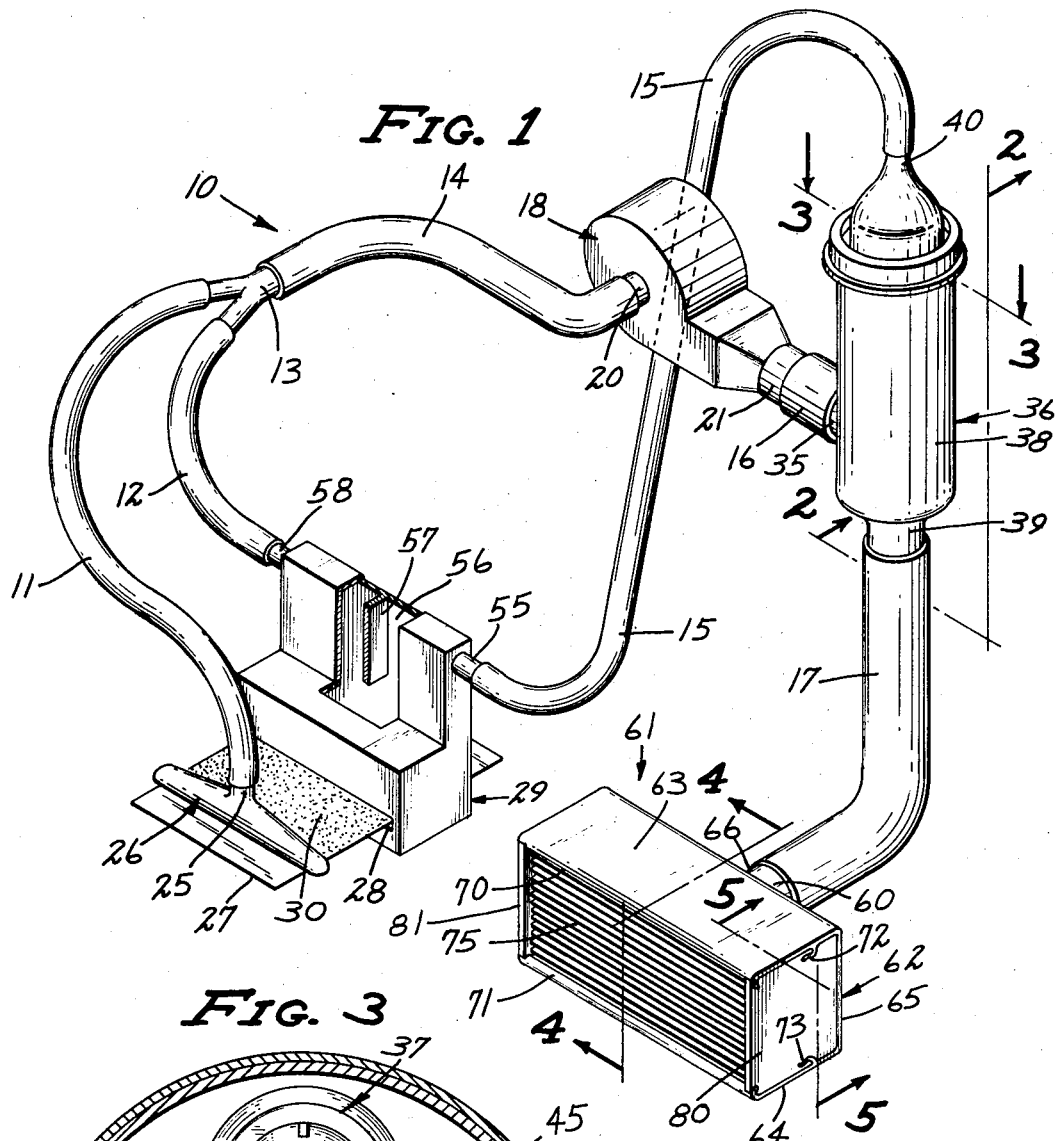
FIG. 1 is a view in perspective of the present apparatus.
Figure 3:
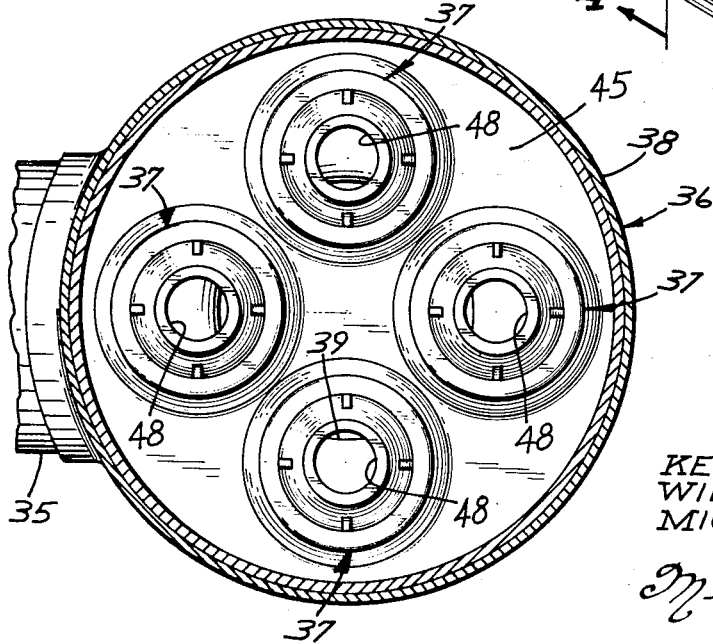
FIG. 3 is an enlarged sectional view as seen from the line 3—3 in FIG. 1.

Referring to FIG. 1, a pneumatic conveyance system, generally designated 10, includes a plurality of conduits 11–17 and a propelling means, blower 18. In the present embodiment the propelling means is the blower 18 but it should be understood that any means of creating a pneumatic flow in the conveyance system 10 could be utilized by those skilled in the art and any such propelling means which performs the functions of this invention comes within the scope thereof.

The blower 18 has an inlet 20 connected to one end of the conduit 14 and an outlet 21 connected to one end of the conduit 16. The opposite end of the conduit 14 is connected to the outlet end of the conduit 13, which is a Y-type coupling conduit wherein the two branches are the inlets and, combined, are approximately the same size as the outlet. One branch of the coupling conduit 13 is connected to one end of the conduit 11 the other end of which is attached to an outlet 25 of a pickup means 26. The pickup means 26 is a vacuum type pickup which draws large quantities of air therein under the impetus of the blower 18 and draws any loose toner particles adjacent thereto into the pickup means 26 with the air. The pickup means 26 is mounted so that copies 27 pass immediately adjacent the mouth thereof as they egress from a toner applying area.

The copies 27 are illustrated egressing from a slot 28 in a box drawn to simulate at least a portion of a copying machine which is herein designated 29. The copies 27 are illustrated entering one side of the copying machine 29 and egressing on the opposite side with loose toner particles 30 thereon. In FIG. 1 the mouth or inlet end of the pickup means 26 is slightly wider than the width of the copies 27 so that all of the loose toner particles 30 on the copies 27 are removed therefrom as the copies 27 move beneath the pickup means 26. These loose toner particles 30 and the air entering the pickup means 26 pass through the conduit 11, coupling conduit 13, conduit 14, blower 18 and conduit 16.

The opposite end of the conduit 16 is attached to an inlet 35 of a separator generally designated 36. In this embodiment the separator 36 includes a plurality of centrifugal separator elements 37 but it should be understood that many other types of separators well known to those skilled in the art might be utilized and all such separators which perform the functions of this invention come within the scope thereof. The separator 36 includes a generally cylindrical hollow housing 38 having the inlet 35 in communication with the central opening and extending radially outwardly from adjacent one end thereof. An outlet 39 for the main flow of air extends axially outwardly from one end of the housing 38 and the other end of the housing 38 has a particle outlet 40, somewhat diminished in cross sectional area, threadedly engaged thereon. The centrifugal separator elements 37 (in this embodiment there are four elements 37) are fixedly mounted between a partition 45, which extends across the housing 38 perpendicular to the longitudinal axis thereof between the particle outlet 40 and inlet 35, and a partition 46, which extends across the housing 38 perpendicular to the longitudinal axis thereof between the outlet 39 and the inlet 35. The partitions 45 and 46 may be mounted within the housing 38 in any convenient manner and will not be described in detail, since it does not form a part of this invention. Each of the centrifugal separator elements 37 includes an outer hollow cylindrical member 47 one end of which tapers radially inwardly toward a scavenging flow outlet 48. A second inner tubular member 49 is mounted coaxially within the outer member 47 at the end opposite the scavenging flow outlet 48. The inner tubular member 49 has an outer diameter substantially smaller than the inner diameter of the outer member 47 so as to form an annular inlet 50 therebetween. The inner tubular member 49 is mounted within the outer member 47 by means of a plurality of helical shaped fins 51 which cause air entering the annular inlet 50 to spiral toward the scavenging flow outlet 48. Because the outlet 48 is tapered inwardly the spiralling air reverses its longitudinal direction and egresses through the inner tubular member 49. However, toner particles entrained in the spiralling air are forced outwardly by centrifugal force and egress from the centrifugal separator elements 37 through the scavenging flow outlet 48 with a relatively small quantity of air utilized for the conveyance thereof. The inner tubular members 49 extend through the partition 46 and the tapered ends of the outer members 47 extend through the partition 45. Thus, the majority of the air entering the inlet 35 egresses through the outlet 39 while the toner particles and a small amount of conveying air egress through the particle outlet 40.

One end of the conduit 15 is attached to the particle outlet 40 while the other end is attached to an inlet 55 of a particle settling chamber 56. The particle settling chamber 56, in this embodiment, forms an integral part of the copying machine 29. However, it should be understood that in many instances the copying machine 29 will be separate and will not constitute a portion of this invention while the particle settling chamber 56 is a portion of this invention and may be attached to the copying machine 29 subsequent to the manufacture thereof. The particle settling chamber 56 is positioned so as to be in communication with the area in the copying machine 29 in which the toner particles 30 are applied to the copies 27. Thus, particles returned to the particle settling chamber 56 through the conduit 15 settle back into the copying machine 29 and are reused. In the present embodiment, a single baffle 57 is illustrated within the particle settling chamber 56 to slow the scavenging flow of air from the particle outlet 40 of the separator 36. As the scavenging flow of air is reduced in velocity, the toner particles settle due to the force of gravity and enter the copying machine 29. It should be understood that means other than the baffle 57 might be utilized, such as a plurality of baffles, additional centrifugal separators, etc. and all such embodiments which perform the functions of this invention come within the scope thereof. The particle settling chamber 56 is provided with a pneumatic outlet 58 having one end of the conduit 12 attached thereto. The other end of the conduit 12 is attached to one branch of the Y-shaped coupling conduit 13 so as to provide a slight suction in the particle settling chamber 56 and lower the pressure therein slightly below atmospheric. The pressure within the particle settling chamber 56 is lowered slightly below atmospheric so that particles are not forced outwardly through cracks and holes which may be present in the cavity. Thus, there is less chance of contaminating the atmosphere with escaping toner particles.

Thus, a substantial flow of air enters the pickup means 26 in a fashion to entrain loose toner particles 30 therein. The flow of air and toner particles passes through the separator 36 with the toner particles passing to the particles settling chamber 56 in a scavenging flow and the main flow of air egressing through the outlet 39 of the separator 36. In some instances the separator 36 may not remove a sufficient amount of the toner particles from the main flow of air and additional filtering means may be desirable. To this end, the conduit 17 is attached between the outlet 39 of the separator 36 and an inlet 60 of a filter assembly generally designated 61. The filter assembly 61 includes a housing 62 having two opposed sidewalls 63 and 64 integrally joined by a third wall 65 to provide a housing 62 with a generally U-shaped cross section. The third or joining wall 65 has an opening therethrough forming the inlet 60. In this embodiment the inlet 60 further includes a short section of conduit 66 removably engaged in the inlet 60 by some convenient means, such as the bayonet-type connection 67, illustrated in detail in FIGS. 4 and 6. It should be understood that the inlet 60 might be formed in any convenient embodiment adapted to mate with the particular conveyance system being utilized and the conduit 66 and bayonet-type connection 67 are illustrated only for exemplary purposes.

The outermost edges of the sidewalls 63 and 64 are turned inwardly and generally rearwardly toward the wall 65 to form first clips 70 and 71, respectively. Second clips 72 and 73 are attached to the inner surfaces of the sidewalls 63 and 64, respectively, and extend longitudinally the length thereof. The second clips 72 and 73 project inwardly from the inner surface of the sidewalls 63 and 64 and forwardly generally parallel with the sidewalls 63 and 64 toward the first clips 70 and 71. In the present embodiment, the first clips 70 and 71 and second clips 72 and 73 are formed as an integral part of the housing 62 in some convenient means, such as extruding, molding, or the like. In general, if the second clips 72 and 73 are formed as an integral part of the housing 62, the extended ends thereof must be spaced from the inner surface of the sidewalls 63 and 64 because of forming requirements. However, preferably, the housing 62 and the clips 72 and 73 will be formed from some material which is subsequently bendable so that the clips 72 and 73 can be bent into a position wherein they abut, or approximately abut, the inner surfaces of the sidewalls 63 and 64 adjacent the extended ends thereof.

A gas permeable pleated filter element 75 is positioned within the housing 62 so that a full pleat adjacent one end thereof is engaged between first clip 70 and second clip 72 and a first pleat adjacent the other end thereof is engaged between first clip 71 and second clip 73. Second clips 72 and 73 are spaced from first clip 70 and 71 a distance of approximately equal to the pleat width of the filter element 75 so that the full pleat at either end of the element 75 may be slid longitudinally between the cooperating clips 70–72 and 71–73 to engage the filter element 75 fixedly within the housing 62. Further, because the second clips 72 and 73 are bent inwardly toward the surfaces of the sidewalls 63 and 64, the second clips 72 and 73 serve to hold the filter element 75 fixedly within the housing 62 during further assembly operations. Further, sufficient pressure on the outer pleat of the filter element 75 by the second clip 72 and 73 may provide a sufficient seal between the filter element 75 and the housing 62 so that no further sealant is needed therebetween.

Two end walls 80 and 81 are provided to seal the entire filter assembly 61 so that all air entering the inlet 60 must pass through the filter element 75 to egress from the filter assembly 61. In the present embodiment, the end walls 80 and 81 are formed by some convenient means such as molding, dipping, or the like and the material from which they are formed is preferably some material easily modified to a liquid state and relatively quickly hardenable, such as plastics and the like. Since the end walls 80 and 81 are preferably formed from material in the liquid state, the material adheres to and completely seals with the ends of the housing 62 and the ends of the filter element 75. Thus, the filter assembly 61 is produced with a minimum number of operations and is very simple and efficient. It should be understood that the filter assembly 61 is not necessary to the operation of the previously described improvement in copying machines and that it is an optional attachment which will further improve the operation thereof.

While we have shown and described a specific embodiment of this invention, further modifications and improvements will occur to this skilled in the art. We desire it to be understood, therefore, that this invention is not limited to the particular form shown and we intend in the appended claims to cover all modifications which do not depart from the spirit and scope of this invention.

What is claimed is:

1. In copying machines utilizing particulate toner having a toner applying area therein, a pneumatic conveyance system comprising:
   a. pickup means, having an inlet positioned adjacent the toner applying area of the copying machine for removing loose toner particles from emerging copies, and an outlet;
   b. a particle settling chamber having at least some opening to atmosphere and having an inlet and an outlet, said settling chamber being positioned adjacent said copying machine in communication with the toner applying area;
   c. a pneumatic flow producing pump having an inlet and an outlet;
   d. centrifugal separating means having an inlet, a gas outlet and a scavenging-flow outlet;
   e. first conduit means, connected between the pump inlet, the outlet of the pickup means and the outlet of the particle settling chamber, for producing flow at sub-atmospheric pressure through the pickup means and flow at sub-atmospheric pressure through the particle settling chamber to prevent particles from escaping through said openings therein;
   f. second conduit means connected between the inlet of the centrifugal separating means and the pump outlet for conducting particles and gas from the pickup means and the particle settling chamber into the centrifugal separating means, said separating means acting to separate the majority of said particles from the main pneumatic flow, the main pneumatic flow egressing from said centrifugal separating means through said gas outlet and the separated particles egressing from said centrifugal separating means through said scavenging-flow outlet; and
   g. third conduit means connected between the scavenging-flow outlet and the inlet of the particle settling chamber for conducting separated particles from the centrifugal separating means into the particle settling chamber.

2. An improvement in copying machines utilizing particulate toner as set forth in claim 1 including in addition a filter assembly having an outlet, an inlet connected to the gas outlet of said separating means, and gas permeable filter means positioned therein so that pneumatic flow from said assembly inlet to said assembly outlet passes through said permeable filter means.

3. An improvement in copying machines utilizing particulate toner as set forth in claim 1 wherein the particle settling chamber includes means for slowing the pneumatic flow therethrough so that entrained toner particles are separated by gravity.

* * * * *